US008738613B2

(12) United States Patent
Ahmed et al.

(10) Patent No.: US 8,738,613 B2
(45) Date of Patent: May 27, 2014

(54) RELEVANCY RANKING OF SEARCH RESULTS IN A NETWORK BASED UPON A USER'S COMPUTER-RELATED ACTIVITIES

(75) Inventors: Maryam Ahmed, Vaughan (CA); Al Chakra, Apex, NC (US); Matthew C. Hillary, Tyler, TX (US); Kimberly D. McCall, Leander, TX (US); M. Scott Thomason, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 73 days.

(21) Appl. No.: 13/550,657

(22) Filed: Jul. 17, 2012

(65) Prior Publication Data

US 2012/0284249 A1     Nov. 8, 2012

Related U.S. Application Data

(63) Continuation of application No. 13/005,614, filed on Jan. 13, 2011.

(51) Int. Cl.
*G06F 17/30*     (2006.01)

(52) U.S. Cl.
USPC ......................................... 707/723; 707/767

(58) Field of Classification Search
USPC ......... 707/705, 706, 708, 727, 723, 732, 736, 707/737, 748, 750, 751, 752, 754, 758, 781, 707/728, 735, 749, 759, 765, 766, 767; 705/1.1, 7.29, 14.4, 14.6
See application file for complete search history.

(56) References Cited

U.S. PATENT DOCUMENTS

| | | | |
|---|---|---|---|
| 4,996,642 A | 2/1991 | Hey | |
| 5,704,017 A | 12/1997 | Heckerman et al. | |
| 6,327,590 B1 | 12/2001 | Chidlovskii et al. | |
| 6,493,702 B1 | 12/2002 | Adar et al. | |
| 7,788,260 B2 | 8/2010 | Lunt et al. | |
| 8,091,032 B2 * | 1/2012 | Fischer | 715/751 |
| 2006/0004892 A1 | 1/2006 | Lunt et al. | |
| 2006/0042483 A1 | 3/2006 | Work et al. | |
| 2006/0235873 A1 | 10/2006 | Thomas | |
| 2007/0198510 A1 | 8/2007 | Ebanks | |

(Continued)

FOREIGN PATENT DOCUMENTS

| | | |
|---|---|---|
| WO | 2009138755 A1 | 11/2009 |
| WO | 2011140609 A1 | 11/2011 |

OTHER PUBLICATIONS

"Tweefind a New Rank-Based Twitter Search", Apr. 6, 2009; http://blog.tmcnet.com/blog/tom-keating/social -networking/tweefind-a-new-rank-based-twitter-search.asp.

(Continued)

*Primary Examiner* — Greta Robinson
(74) *Attorney, Agent, or Firm* — Joe Polimeni; SVL IP Law

(57) ABSTRACT

A computer-implemented method, system and computer program product providing ordered search results within a search engine. Items are retrieved from a network satisfying search criteria provided by a user. Computer-related activities performed by the user, including social networking activities, are determined, and the retrieved items are ranked based on the computer-related activities. The ranking of the retrieved items is dependent upon whether any retrieved item has been referenced by the social networking activities of the user, and the search results are provided including the retrieved items in order of the ranking.

5 Claims, 3 Drawing Sheets

(56) References Cited

U.S. PATENT DOCUMENTS

| | | |
|---|---|---|
| 2008/0065600 A1 | 3/2008 | Batteram et al. |
| 2008/0301112 A1 | 12/2008 | Wu |
| 2009/0119173 A1 | 5/2009 | Parsons et al. |
| 2009/0125511 A1 | 5/2009 | Kumar |
| 2009/0171813 A1 | 7/2009 | Byrne et al. |
| 2009/0282002 A1 | 11/2009 | Reeder et al. |
| 2010/0094869 A1 | 4/2010 | Ebanks |
| 2010/0153215 A1 | 6/2010 | Abraham |
| 2010/0153371 A1 | 6/2010 | Singh |
| 2010/0174709 A1 | 7/2010 | Hansen et al. |
| 2010/0174712 A1 | 7/2010 | Li et al. |
| 2010/0228715 A1 | 9/2010 | Lawrence |
| 2011/0022602 A1* | 1/2011 | Luo et al. ............... 707/748 |
| 2011/0082858 A1 | 4/2011 | Yu et al. |
| 2011/0093460 A1 | 4/2011 | Lunt et al. |
| 2011/0137989 A1* | 6/2011 | Kiciman et al. ......... 709/204 |
| 2011/0238673 A1* | 9/2011 | Carter et al. ............ 707/748 |
| 2011/0264648 A1 | 10/2011 | Gulik et al. |
| 2011/0302521 A1 | 12/2011 | Jiang et al. |
| 2012/0023085 A1 | 1/2012 | Bellerive et al. |
| 2012/0185472 A1 | 7/2012 | Ahmed et al. |

OTHER PUBLICATIONS

International Search Report and Written Opinion from counterpart application PCT/IB2012/050062 mailed May 3, 2012.

\* cited by examiner

US 8,738,613 B2

RELEVANCY RANKING OF SEARCH RESULTS IN A NETWORK BASED UPON A USER'S COMPUTER-RELATED ACTIVITIES

CROSS-REFERENCE TO RELATED APPLICATIONS

This application is a continuation of U.S. patent application Ser. No. 13/005,614, entitled "Relevancy Ranking Of Search Results In A Network Based Upon A User's Computer-Related Activities" and filed Jan. 13, 2011, the disclosure of which is incorporated herein by reference in its entirety.

BACKGROUND

1. Technical Field

The present invention relates to providing web-based (internet or intranet) search results based upon a search query utilizing a search engine, where the search results are ranked based upon a relevance associated with computer-related activities of the user.

2. Discussion of the Related Art

Social media networks facilitate the following of people and/or groups on internet or intranet web sites. Some examples of social media networks include, without limitation, internet websites such as Facebook, Myspace, LinkedIn and Twitter. The Twitter website offers a social networking and blogging site that facilitates the sending and reading of messages by users referred to as "tweets". Tweets are text-based posts of up to 140 characters displayed on a user's profile page. Tweets can be publicly available to users/subscribers of Twitter or, alternatively, restricted to a particular list of users (e.g., a friends list). Users may subscribe to other users' tweets, and this is known as following. The following users in Twitter are known as followers. Other social media networks also provide users with the capability to post messages or other information that is available to others, either publicly available or restricted to those granted access to a particular user's profile page.

Twitter permits a user to retweet (RT) relevant content to followers of the user. Users can also group posts together by topic or type by use of a hashtag statement. A hashtag is a word or phrase having the prefix "#" in the statement. The more often content in Twitter is retweeted or common hashtags are used provides an indication that such content is likely desired by followers of the accounts that are the senders or recipients of such retweets having hashtags of special interest.

Social networks such as Twitter also allow the user to generate lists of other users to follow as well as group lists of users to follow (or to not follow). In addition, search engines for such social media networks allow users to search for content desirable to a particular user (e.g., to find a friend or information on a particular subject that is of interest to the user).

With the ever increasing number of people utilizing such social networks and the large amount of content and information available for consumption, it is important to utilize a search engine that provides desirable and relevant information to the user. For example, a follower in Twitter may have a large group list that the user is following, which could result in a content amount that is too large or extensive to review. A search engine that can further categorize the content based upon relevancy would enhance the user's ability to follow tweets of interest to the user.

BRIEF SUMMARY

Accordingly, embodiments of the present invention include a method, a computer program product and a system for providing ordered search results within a search engine. The embodiments comprise the features of retrieving items from a network satisfying search criteria provided by a user, determining computer-related activities performed by the user, where the computer-related activities comprise social networking activities, ranking the retrieved items based on the computer-related activities, where the ranking of the retrieved items is dependent upon whether any retrieved item has been referenced by the social networking activities of the user, and providing the search results including the retrieved items in order of the ranking.

The above and still further features and advantages of embodiments of the present invention will become apparent upon consideration of the following detailed description thereof, particularly when taken in conjunction with the accompanying drawings wherein like reference numerals in the various figures are utilized to designate like components.

DETAILED DESCRIPTION

In accordance with embodiments of the present invention, a method, system and computer program product provide ordered and relevant search results in response to a search query by a user and utilize a search engine that searches any one or more networks, where the search results obtained by the search engine are modified based upon computer-related activities of the user. In particular, computer-related activities of the user that can be used to modify the ranking of search results include the user's activities and relationships on a social media network, where the ordered search results are ranked based upon the social relationships between a searching user and other users (e.g., other users to which the searching user follows).

For example, a search engine can be implemented to generate search results based upon a search of a social media network (e.g., searching postings or other messages at the social media network, such as tweets in Twitter, for content associated with the user's search query), where the ranking of the search results is modified by prioritizing search results associated with other users with whom the searching user has an established social networking relationship. In another example embodiment, a search engine can be implemented to generate search results based upon a search from any number of networks, databases, etc. which are accessible via the world wide web (i.e., a search of the entire world wide web instead of within a single network such as a social media network), with a modified ranking of the search results being based upon related content in the user's social media network relationships and/or other computer-related activities of the user (e.g., based upon a history of applications used by the user, a history of websites, blogs, chats, etc. visited by the user on the internet which have content related to the user's search query).

The social networking relationship determinants that are utilized to influence ranking of search results by the search engine can be based on direct, indirect, and mutual relationships (e.g., other users with which the searching user follows) and/or on shared uses of common posts for other users to which the searching user has a relationship (e.g., retweets and/or common hashtags for users with whom the searching user follows in Twitter). The ranking of the search results based upon social networking relationships of the searching user can be dependent based upon how direct the relationship is between the searching user and each user who posts content that relates to the search query and/or is part of the search results, as well as the frequency of occurrences of posts by users that relate to the search query and/or form part of the search results.

Figure 1:
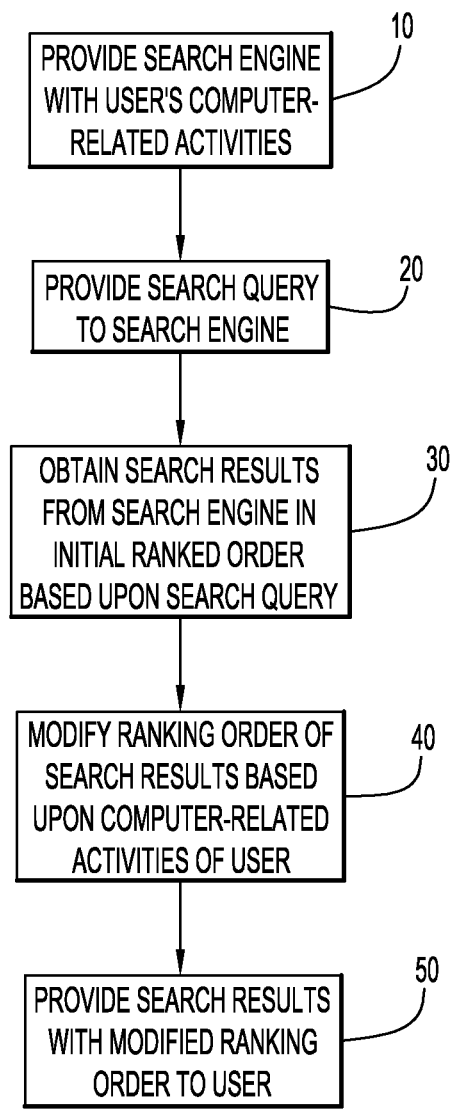
FIG. 1 provides a flowchart depicting an example method of providing search results from a search engine in accordance with the present invention, where the ranking of search results has been modified based upon computer-related activities of the user.

A flowchart is depicted in FIG. 1 and provides the general method steps associated with ranking search results by a search engine based upon computer-related activities of the user. As used herein, computer-related activities by a user refers to any activities that a user performs on a computer that the user desires to utilize to influence the ranking of search results by a search engine. Such computer-related activities can include, without limitation, computer programs or applications of interest to the user, content associated with websites of interest to the user or frequently visited by the user, and content that is associated with posts or messages (e.g., tweets in Twitter) in a social media networking community with which the user has an association or connection (e.g., tweets by other users with whom the user follows directly and/or indirectly).

In step 10, the user provides the search engine with the user's computer-related activities with which the user desires to influence ordering or ranking of search results to be obtained from the search engine based upon a search query provided to the search engine. The search engine can be provided as a web link at a social media networking site or accessible via any suitable uniform resource locator (URL) location on the World Wide Web (e.g., an internet website such as www.google.com).

In a scenario in which the user's social networking activities are to be utilized to influence the ranking of search results, the user enables the search engine to utilize information from the one or more social media networks of the user (e.g., Twitter, Facebook, etc.). For example, in a scenario in which the user may be searching for content in Twitter or may wish to use social networking relationships from his or her Twitter account for an internet search, the user provides the search engine with information relating to which Twitter user accounts the user follows. The information can be provided to the search engine in any conventional or other suitable manner (e.g., by providing a user identification and/or password to the search engine and/or manually providing information to the search engine in fields identifying the user's Twitter account and/or user accounts which the user follows in Twitter).

The user then provides a search query to the search engine (step 20). The search engine obtains the search results based upon the search query (step 30), where the search results include retrieved items that are initially ranked in a suitable order based upon the searching methodology of the search engine. Any conventional or other type of searching strategy can be utilized by the search engine to obtain a set of search results comprising retrieved items in an initial ranking order. Next, the search engine modifies the initial ranking order of the search results based upon the computer-related activities of the user (step 40). Examples of different ways in which ranking of search results can be modified based upon computer-related activities of the user are described below. The search results are then provided to the user in any suitable manner (e.g., via a display monitor) by the search engine in the modified ranking order (step 50).

Examples of how search results obtained from a search engine can be modified based upon computer-related activities of the user are now described in relation to a Twitter social media network (also referred to herein simply as Twitter). However, it is noted that the present invention is not limited to Twitter applications but instead is applicable to any other type of social media network in which users can follow other users and search for content within the social media network.

In an example embodiment, a search of the Twitter social media network provides search results that are based upon the user's search query, where ranking of the search results is modified based upon the relationship tiers between the searching user and the users with whom the searching user follows. As the degree of separation decreases within the relationship tier between the searching user and a user who has posted a message or generated a tweet that is within the search result, the ranking of such tweet in the search result will be increased. In contrast, as the degree of separation increases within the relationship tier between the searching user and a user who has posted a message or generated a tweet that is within the search result, the ranking of such tweet in the search result will be decreased. In addition, the ranking activity for a search result will increase relative to other search results when such search result has more activity associated with it in the group of users to whom the searching user follows (e.g., the search result may be a hashtag or a retweet).

In another example embodiment, ranking or ordering of search results from a search of the Internet can be modified based upon information or content in tweets, retweets and/or hashtags associated with users in a group the searching user follows in Twitter. The ranking or ordering of the Internet search results can further be adjusted based upon other factors including, without limitation, a history of the types of applications used, a history of the types of websites visited, and a history of the types/content of chats and/or blogs visited or participated in by the searching user.

Figure 2:
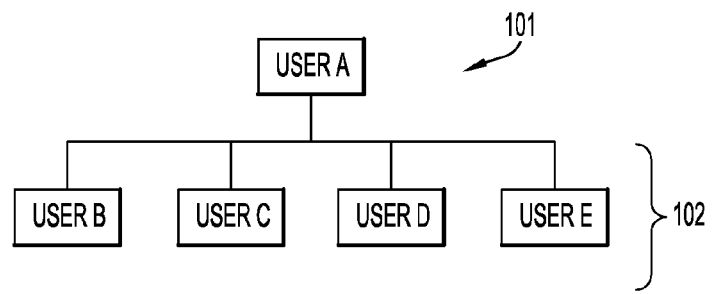
FIGS. 2-4 are block diagrams depicting a hierarchical structure of users who follow other users in a social media network.
Figure 3:
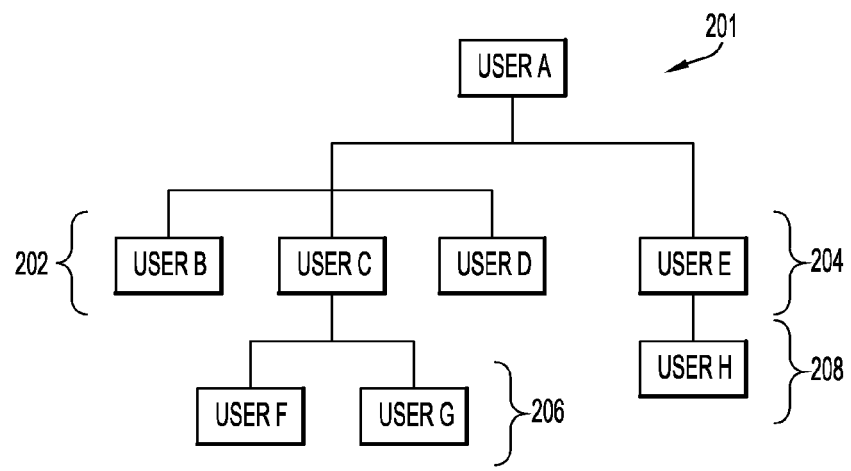
Figure 4:
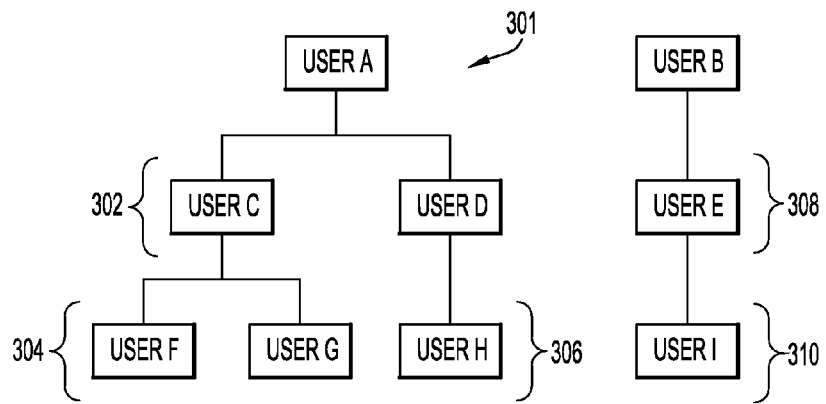

Some example embodiments are now described including a hierarchical grouping of users in Twitter as shown in the block diagrams of FIGS. 2-4. As noted above, while these examples are being described in relation to the Twitter social media network, the invention is not limited to this particular social media network but instead is applicable to all other types of social media networks.

The example embodiment shown in FIG. 2 schematically shows a group 101 of users including a User A account which is being followed by User accounts B, C, D and E (since Users B, C, D and E are all linked to and below User A in the hierarchical order). This is a simple structure showing only a single tier 102 of followers for User A. However, it is noted that actual scenarios can include multiple tiers, with followers of User A being indirectly linked through multiple tiers.

In Twitter (as well as other social media networks), when one designates a user or users to follow, the understanding is that there is some common interest with the followers who are following one or more users. The level of interest may be greater the closer the degree of separation from the follower and the user to which the follower is following. For example, the tier 102 of Users B, C, D and E in FIG. 2 may have a great interest in following User A. If User A is following a user, Users B, C, D and E would also follow the user with which User A follows but with a degree of separation that is greater. The level of interest may not be as significant for Users B, C, D and E in relation to any users which User A is following. This is taken into account in accordance with the present invention, such that the influence on ordering or ranking of search results based upon social media content relating to users to which the searching user is following will decrease as the degree of separation increases between the searching user and the users to which the searching user is following.

Additionally, when the user accounts that are being followed by other users provide an indication that something is important, for example by using hashtags or retweets, there is a greater likelihood that following users will be interested in this information. For example, the greater frequency with which information (such as a Uniform Resource Locator or URL reference, such as normal URLs or shortened URLs) is retweeted by other users in the group of followers provides an indication that such information may be of greater interest to a follower in the group. Thus, the frequency with which the same information is retweeted or provided in hashtags by followers in the group can be used to adjust or modify search results by a user to the extent that the search results include information that is common with the information in the retweets and hashtags.

In an example scenario using the group of followers shown in FIG. 2, assume User A tweets a reference (e.g., a URL link) to a document A in the Twitter social media network. For example, document A is a developerworks document for a product by IBM Corporation. The developerworks document includes keywords such as Java, Websphere, application server and security. A search engine is provided at a suitable search site (e.g., as a webpage link within Twitter or, alternatively, at another website supported by another network separate from Twitter). The search engine finds the reference to document A in any conventional or other suitable manner and adds this reference to its index. Assume User B is interested in conducting a search and enables the search engine to determine which Twitter accounts are being followed by User B (e.g., step 10 in FIG. 1, where the search engine is enabled to determine that User B follows User A based upon the group 101 shown in FIG. 2).

User B conducts a search by providing a search query to the search engine (step 20 in FIG. 1) using one or more of the keywords associated with the document A. The search engine finds a number of references in the search results including the reference to document A (step 30 in FIG. 1). In accordance with the present invention, the search engine modifies the ranking of search results (step 40 of FIG. 1) by providing a higher ranking or ordering for the reference to document A in relation to other content that has not been tweeted by Twitter accounts that are being followed by User B. This is because the search engine identifies that User A, which is an account which User B follows, has tweeted a reference to document A.

In this same example scenario, assume User B retweets the reference to document A in Twitter. Next, assume User C, who is also a follower of User A and has a relationship with User B (since they both follow User A, as can be seen in FIG. 2), is also interested in conducting a search and enables the search engine to determine which Twitter accounts are being followed by User C (step 10 in FIG. 1). User C conducts a search by providing a search query to the search engine (step 20 in FIG. 1) that is the same or similar to User B's search and using one or more of the keywords associated with the document A. As with the search by User B, the search engine finds a number of references in the search results including the reference to document A (step 30 in FIG. 1). In accordance with the present invention, the search engine modifies the search results by providing a higher ranking or ordering for the reference to document A in relation to other content that has not been tweeted by Twitter accounts that are being followed by User C. In addition, the reference to document A has an even higher ranking in the search results for User C in comparison to the search results for User B, since the search engine identifies the same tweet information with respect to the reference to document A as in the User B search and further identifies that the reference to document A has been retweeted more often (i.e., at least one more time) in the same community of followers when User C conducted the search in relation to when User B conducted the search.

In a modified scenario using the group 101 of users shown in FIG. 2, assume User A tweets the same reference to document A including the same keywords, and that the tweet further includes a hashtag (e.g., #wassec). Further assume that Users C and D have also used the same hashtag in some of their tweets. As in the previous scenario, User B is interested in conducting a search and enables the search engine to identify which Twitter accounts are being followed by User B (step 10 in FIG. 1). User B conducts the same search by providing a search query to the search engine (step 20 in FIG. 1) using one or more of the keywords associated with the document A. The search engine finds a number of references in the search results including the reference to document A (step 30 in FIG. 1). In accordance with the present invention, the search engine modifies the search results (step 40 in FIG. 1) by providing a higher ranking or ordering for the reference to document A in relation to other content that has not been tweeted by Twitter accounts that are being followed by User B. This is because the search engine identifies that User A has tweeted a reference to document A including an associated hashtag and also that User A followers (i.e., Users C and D) have also tweeted content including the same hashtag, where the frequency of use of the same hashtag associated with document A has increased (i.e., the hashtag is more common in the community of followers for User A).

If User B (or any other user in the community or group of followers) retweets the reference to document A and/or tweets using the same hashtag associated with document A in Twitter, then any subsequent search by one or more users in the group of followers for the same or similar content utilizing the search engine would result in an even higher ranking of the reference to document A. Thus, the frequency with which a reference to document A has been tweeted, retweeted and/or hashtags associated with document A have been tweeted within the group of followers will increase the order or ranking of this reference in the search results based upon a search query including keywords associated with document A.

In addition, it is noted that any tweets or retweets by users in the community or group of followers which include hashtags for keywords or other information associated with a reference to a document can also be used by the search engine to adjust the ranking or ordering of search results in relation to a search query by a user in the group of followers that would include the reference to such document. For example, when considering document A, which (as noted above) could be a developerworks document for an IBM product that contains the keywords Java, Websphere, application server and security, any tweets or retweets by users in the group of followers using specific hashtags such as #java, #websphere, #appserver, etc., would result in a higher ranking by the search engine of the reference to document A in the search results based upon a search query by a user in the group that includes search terms that are the same or similar as such keywords for document A.

In another example embodiment depicted in FIG. 3, a community 201 including groups of Twitter accounts is shown in which User A is being directly followed by a first group 202 including Users B, C and D. User A is also being followed in a separate group 204 including User E. In addition, Users F and G are in a group 206 that follows User C, while User H is in a group 208 that follows User E. In this scenario, assume that User A tweets in Twitter with references to two URLs, URL 1 and URL 2. In addition, Users B and C retweet URL 1 to their followers, while User D retweets URL 2 to its followers. A search engine (e.g., located within the Twitter network or as part of a separate network) scans Twitter accounts to determine which users tweeted information such as URLs. Assume User E is interested in conducting a search and enables the search engine to know which Twitter accounts are being followed by User E (where User E directly follows User A as shown in FIG. 3). In a search query by User E that generates search results by the search engine including URLs 1 and 2, the search engine would modify the search results such that URL 1 has a higher ranking than URL 2 because URL 1 was retweeted more often than URL 2 by followers within the community or group 201 with which User E is associated (i.e., URL 1 was tweeted once by User A, and then retweeted a total of two times by Users B and C, while URL 2 was tweeted once by User A and retweeted once by User D).

Next, assume User E retweets URL 2 in Twitter. User D also enables the search site to determine which Twitter accounts are being followed by User D. When User D conducts a search that includes URLs 1 and 2 in the search results, the search engine will rank URL 1 higher than URL 2. This is because URL 1 was retweeted more often by followers in the same group as User D (i.e., Users B and C are in the same immediate group 202 of followers from User A as User D), and the retweet by User E is less relevant in relation to User D (since User E is not in the immediate group of User D). It is noted that URL 2, while being ranked lower than URL 1, will still be ranked higher in relation to other URLs listed in the search results which have not been referenced by users in the community or groups of followers from User A.

A further example embodiment is now described with reference to FIG. 4. FIG. 4 shows a block diagram of users in Twitter and their relationships with each other. The social community 301 includes Users A and B with multiple levels or tiers of followers. In particular, User A includes a first tier 302 of followers including Users C and D, where User C has a tier 304 of followers including Users F and G and User D has a tier 306 of followers including User H. User B includes a first tier 308 of followers including User E and User E includes a tier 310 of followers including User I. In addition, while not shown in FIG. 4, Users A and B could be related in the community by following other users that are linked in some manner (e.g., in an upper tier above Users A and B).

The following table represents an example of Twitter activity for the group of users:
Twitter Activity:

| Tweet | User | Text |
|---|---|---|
| T1 | A | Check out URL 1 |
| T2 | D | RT @A Check out URL 1 |
| T3 | B | Hey, URL 2 is cool. #HT1 |

-continued

| Tweet | User | Text |
|---|---|---|
| T4 | C | Look at URL 2 #HT1 |
| T5 | D | Check Out URL 2 |

Assume User H is interested in conducting a search with a search engine at a search site and enables the search engine to know which Twitter accounts are being followed by User H (i.e., User H follows User D, which follows User A). The search result returns a listing of URLs including URL 1, URL 2, URL 3, URL 4, URL 5, URL 6, URL 7 and URL 8. Based upon the search query, the search engine initially provides a ranked order of search results as follows: URL 4, URL 5, URL 3, URL 1, URL 7, URL 8, URL 2, URL 6.

The search engine determines which tweets, as shown in the table above, are relevant to the search results in relation to the groups to which User H is directly and indirectly associated. In this particular scenario, the following tweets are relevant: T1 has relevance for URL 1 (since User H directly follows User D, and User D directly follows User A); T2 has relevance for URL 1 (since User H directly follows User D); T4 has relevance for URL 2 (since User H is indirectly related to User C by association with grandparent User A); T5 has relevance for URL 2 (since User H follows User D). In addition, both tweets T3 and T4 utilize the same hashtag #HT1 in relation to URL 2, which further enhances the priority ranking of URL 2.

The search engine modifies the rankings of the URLs 1-8 based upon the relevance of the tweets in relation to User H. In particular, the ranking order for each URL can be adjusted based upon the following general formula:

$$Rank(URL1)=OriginalRank(URL1)*AdjFactor(T1)*AdjFactor(T2)$$

$$Rank(URL2)=OriginalRank(URL2)*AdjFactor(T3)*AdjFactor(T4)*AdjFactor(T5)$$

$$Rank(URL3)=OriginalRank(URL3)$$

$$Rank(URL4)=OriginalRank(URL4)$$

Etc.

The original rank in the formula is the initial ranking the search engine provides to the URL in the search results prior to any modifications based upon Twitter social media account activity of User H. As can be seen from the formulas above, URL3 and URL4 (as well as URLs 5-8) are not modified, since there was no relevant Twitter account activity identified by the search engine in relation to the social environment determined for User H (i.e., based upon groups to which User H has some direct or indirect association as a follower) and there further was no hashtag associated with these URLs detected by the search engine within the Twitter social media network.

The AdjFactor relates to a predetermined adjustment factor value for a tweet (e.g., tweet T1) in relation to a particular URL. The adjustment factor value can be based upon any of the criteria as noted above in the previous examples, such as a greater adjustment factor value for tweets that are at a closer tier level to the searching user within the searching user's group or community, a higher adjustment factor value based upon the number of times a URL is tweeted, retweeted and/or associated with a hashtag (e.g., a first URL referenced in 3 tweets in a group of followers to which the searching user belongs would have a greater adjustment factor value in comparison to a second URL that is referenced in 2 tweets in the same group of followers to which the searching user belongs).

Thus, in the scenario involving a search by User H, the original ranking order by the search engine (URL 4, URL 5, URL 3, URL 1, URL 7, URL 8, URL 2, URL 6) would likely be adjusted with URLs 1 and 2 being moved further forward in priority on the search result list as a result of the tweeting, retweeting and/or hashtag activities associated with these URLs in the Twitter community to which User H belongs (with the exact increase in the ranking order being dependent upon specific adjustment factor values to be applied for a particular application).

The methods described in the above examples and depicted in the flowchart of FIG. 1 can be implemented utilizing any suitable system including hardware and software implemented in any suitable number of modules disposed within networks that are operatively coupled with each other to facilitate sharing and transfer of information between networks.

Figure 5:
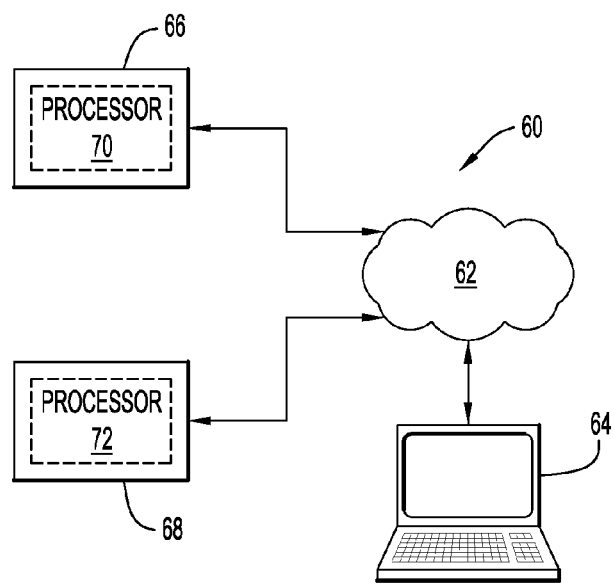
FIG. 5 is a block diagram illustrating an example system of the present invention, including a search engine coupled with one or databases.

An example system for providing search results with a modified ranking order based upon computer-related activities of the user in accordance with the present invention is schematically depicted in FIG. 5. In particular, system 60 includes a cloud networking system 62 (e.g., the World Wide Web) which links a plurality of networks together, including network 66 and network 68. Each of the networks includes one or more servers or other suitable hardware including one or more database units for storing data representing information available to users accessing such networks. The cloud networking system 62 further provides access to user terminals such as terminal 64 (e.g., a personal home computer of a user with an established internet connection), such that a terminal 64 is operatively coupled via system 62 to the linked networks including networks 66 and 68. A search engine module can be implemented as a processor 70 which is a part of a social media network 66 (e.g., Twitter, Facebook, Myspace, LinkedIn, etc.) or, alternatively, the search engine module can be implemented as a processor 72 which is part of another network 68 (e.g., another internet website) that is separate from but has access to information within network 66. The search engine module is configured with suitable software to facilitate searching of one or more networks (e.g., searching of the social media network 66 and/or any other networks linked together via system 62) and is further configured to receive information relating to a user's computer related activities.

In operation, a user of social media network 66 can access this and other networks via connection of the terminal 64 of the user with cloud networking system 62. The user utilizes terminal 64 to provide the user's computer-related activities to the search engine module (implemented as processor 70 or processor 72). As noted above, the computer-related activities can be social networking information regarding other users within the social media network 66 to which the user has an established social relationship (e.g., linking to other users as a follower in group lists for Twitter). The user inputs a search query, via terminal 64, that is transmitted to the search engine module, and the search engine module obtains search results with a ranking order that is modified based upon the computer-related activities of the user (e.g., based upon established social relationships of the user of a Twitter account in accordance with the examples described above). The modified search results are provided to the user on a display of the terminal 64.

The network servers, network databases and user terminals can be any suitable computer systems implemented by any type of hardware and/or other processing circuitry. In particular, the network servers, network databases and user terminals may be implemented by any quantity of conventional or other computer systems or devices (e.g., computer terminals, personal computers (e.g., IBM-compatible, Apple MacIntosh, tablet, laptop, etc.), etc.), cellular telephones, personal data assistants (e.g., Palm Pre, Droid, iPhone, etc.), etc., and may include any commercially available operating system (e.g., AIX, Android, Linux, OSX, Sun Solaris, Unix, Windows, etc.) and any commercially available or custom software (e.g., browser software, communications software, word processing software, etc.). These systems may include types of displays and input devices (e.g., keyboard, mouse, voice recognition, etc.) to enter and/or view information.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed:

1. A computer-implemented method of providing ordered search results within a search engine comprising:
retrieving items from a network satisfying search criteria provided by a user and ranking the retrieved items in an initial ranked order based upon the search criteria;
determining computer-related activities associated with the user, wherein the computer-related activities comprise social networking activities;
ranking the retrieved items based on the computer-related activities, wherein the ranking of the retrieved items is dependent upon whether any retrieved item has been referenced by the social networking activities, and the ranking the retrieved items based on the computer-related activities further includes:
determining one or more relevance factors for each retrieved item referenced by the social networking activities, wherein each relevance factor for a retrieved item is based upon a corresponding reference of that retrieved item by the social networking activities; and
modifying the initial ranked order of the retrieved items by applying the one or more relevance factors of each corresponding retrieved item to the initial ranked order of that corresponding retrieved item to produce a modified ranking; and
providing the search results including the retrieved items in order of the modified ranking.

2. The method of claim 1, wherein at least one relevance factor for a retrieved item is dependent upon a number of references to the retrieved item in the social networking activities.

3. The method of claim 1, wherein the social networking activities of associated with the user comprise activities in a social media network, the social media network comprising a hierarchical grouping of entities that includes the user, and at least one relevance factor for a retrieved item is dependent upon a distance in the hierarchical grouping between the user and each entity which references the retrieved item.

4. The method of claim 1, wherein at least one of the retrieved items is from a social networking website.

5. The method of claim 1, wherein the network from which items are retrieved comprises the internet or intranet, and the social networking activities comprise activities that occur on a social media website that is accessible via the internet or intranet.

* * * * *